Jan. 29, 1963  R. VOGEL  3,075,504
HYDRAULIC TRANSMISSION SYSTEM
Filed Dec. 30, 1960  4 Sheets-Sheet 1

RICHARD VOGEL
INVENTOR.

BY

AGENT

Jan. 29, 1963 R. VOGEL 3,075,504
HYDRAULIC TRANSMISSION SYSTEM
Filed Dec. 30, 1960 4 Sheets-Sheet 2

RICHARD VOGEL
*INVENTOR.*

BY *Karl F. Ross*

AGENT

Jan. 29, 1963    R. VOGEL    3,075,504
HYDRAULIC TRANSMISSION SYSTEM
Filed Dec. 30, 1960    4 Sheets-Sheet 3

RICHARD VOGEL
INVENTOR.

BY Karl F. Ross
AGENT

United States Patent Office 3,075,504
Patented Jan. 29, 1963

3,075,504
HYDRAULIC TRANSMISSION SYSTEM
Richard Vogel, Nordhausen, Harz, Germany, assignor to VEB Schlepperwerk Nordhausen, Nordhausen, Harz, Germany, a corporation of Germany
Filed Dec. 30, 1960, Ser. No. 79,788
3 Claims. (Cl. 121—121)

My present invention relates to a hydraulic transmission system for tractors, agricultural implements, earth-moving machinery and the like.

The advantages of flexibility, smoothness of operation and non-positive drive have made the use of fluid-operated power-transmission systems very desirable in heavy-duty machinery as well as in automotive vehicles in general. Conventional hydraulic drives, of the general type used in passenger cars, can be designed for transmitting large torques but are then usually of cumbersome and bulky construction which requires very precise and therefore costly production methods.

It is an object of the present invention to provide a hydraulic drive of relatively simple design capable of transmitting large torques but operating with a relatively low hydrostatic pressure.

It is a further object of the present invention to provide a heavy duty hydraulic drive of low weight and with small space requirements, thus one which is easy to install and suitable for use as a component in various agricultural and earth-moving machines.

In accordance with the invention I provide a pair of relatively rotatable, co-axial drive members of which the first has a substantially cylindrical surface from which a plurality of piston cylinders extend generally radially into the body of the member, the pistons or plungers therein being cyclically actuated by hydrostatic pressure so as to bear upon a cam-shaped peripheral surface of the second drive member in such timed relationship that relative rotation of the members will ensue. The second drive member is, for this purpose, of generally prismatic configuration, preferably with not more than four plane or curved sides, so as to be readily displaceable relatively to the first member at a speed determined by the rate of transfer of hydraulic pressure from one piston cylinder to the next. If this transfer of pressure is accomplished by a hydraulic distributor coupled with the rotatable drive member (preferably the second member), the system will have a variable speed dependent upon the available input pressure and the load resistance; if, on the other hand, the distributor is controlled independently of the relative speed of the drive members, the system will have a torque dependent on input pressure and a speed which is adjustable with that of the distributor. Thus, the two types of system can be respectively compared to a series-type and a shunt-type electric motor, the former being particularly adapted for heavy loads, with slow starts and gradual acceleration, the latter being capable of operating with light and moderate loads at substantially constant speeds.

The invention will be better understood from the following description of several embodiments, reference being made to the accompanying drawing in which.

Figure 1:
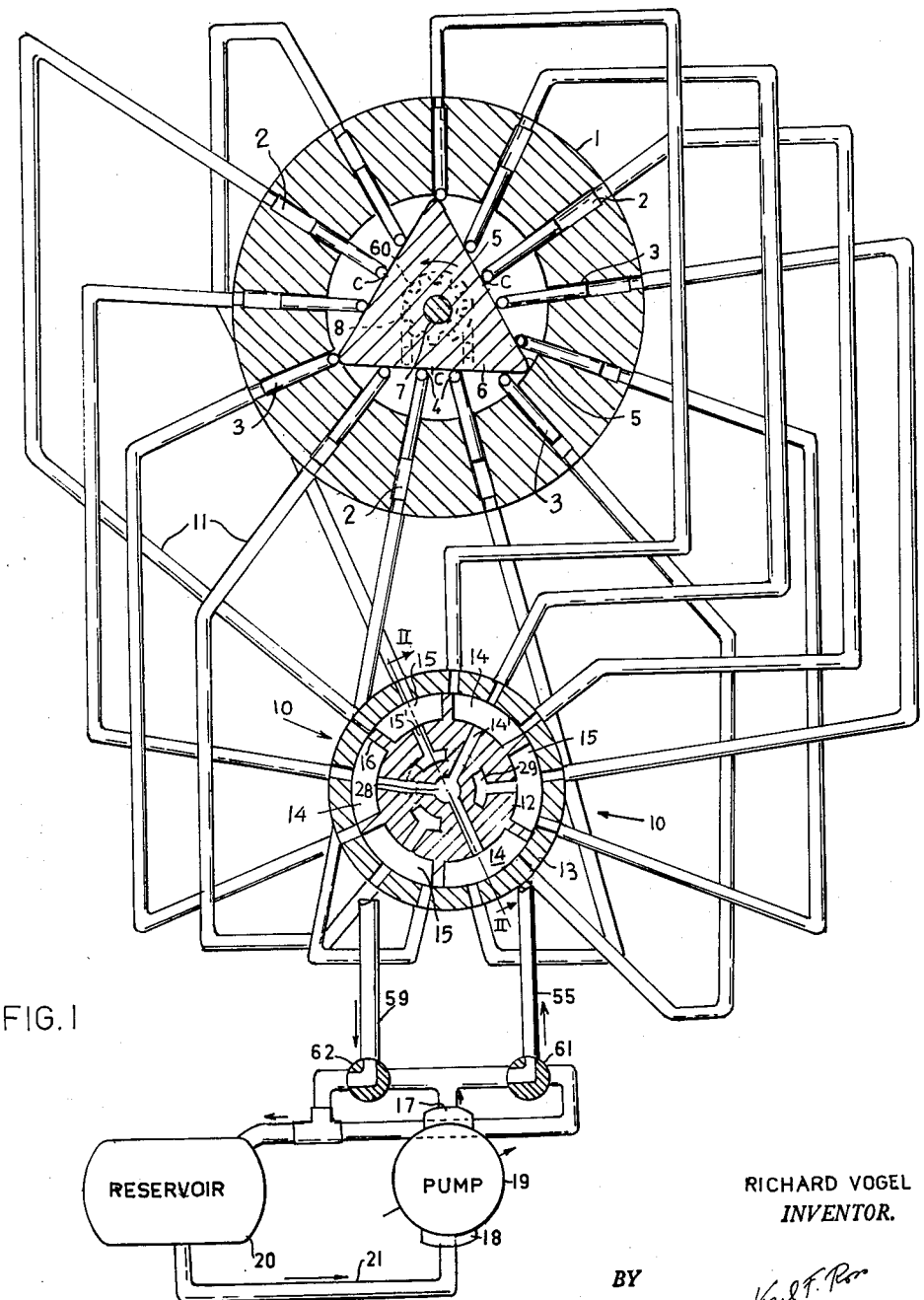
FIG. 1 is a somewhat diagrammatical view of a transmission system comprising a hydraulic drive according to my invention.
Figure 2:
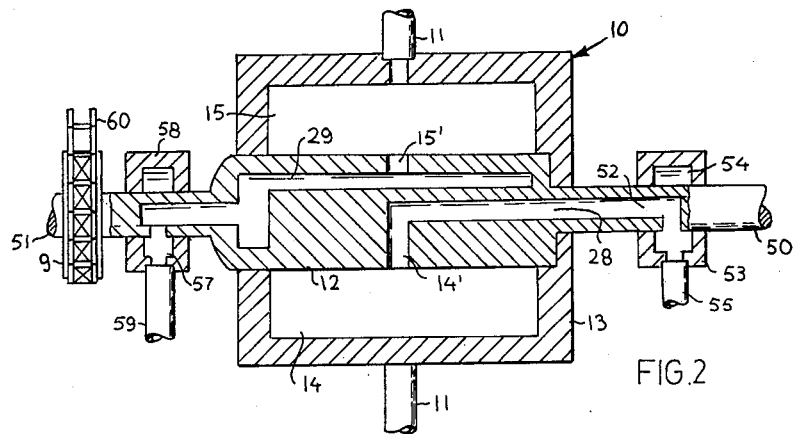
FIG. 2 is a sectional view taken on the line II—II of FIG. 1.

As shown in FIGS. 1 and 2, a stationary primary driving member 1 of tubular configuration is formed with a plurality of angularly spaced radial borings or piston cylinders 2 for accommodating plungers 3, each plunger being provided at its outer end with an anti-friction roller 4 which is in contact with a camming surface 5 of a prismatic secondary or driven member 6, of triangular cross-section, rotatably mounted inside the member 1 on a shaft 7. The shaft 7 bears a sprocket 8 connected by a chain drive 60 to a sprocket 9 which is keyed to a shaft 50 of a distributor 10. The distributor 10 comprises a cylindrical housing 13 and a rotor 12 which is mounted on the shaft 50 and a companion shaft 51 aligned therewith. The rotor 12 is provided on its periphery with alternate valve chambers 14 and 15 separated from each other by vanes 16. The chambers 14 are all connected by radial passages 14' to a central bore 28 communicating with a central bore 52 in the shaft 50 on one side of rotor 12; this shaft is lodged in a bearing sleeve 53 having an internal annular recess 54 for the passage of fluid from conduit 55 to bore 52 or vice versa. Similarly, the other set of chambers 15 are connected by radial passages 15' to an annular duct 29 communicating with a central bore 56 in the shaft 51 on the opposite side of the rotor; from bore 56 the fluid path leads through an annular recess 57 in a bearing sleeve 58 to a conduit 59 connected thereto. A pump 19 has a high-pressure port 17 alternately connected to conduits 55, 59 by three-way valves 61, 62; the conduit not so connected communicates via the respective valve with the inlet of a reservoir 20 whose outlet empties through a return pipe 21 into the low-pressure port 18 of pump 19. Conduits 11 extend from the piston cylinders 2 of member 1 to corresponding locations along the periphery of distributor housing 13; it should be understood that the showing of these conduits is strictly diagrammatic and that in practice the distributor housing 13 may be co-axial and rigid with the stationary driving member 1.

The hydraulic system shown in FIGS. 1 and 2 operates in the following manner:

Pump 19 is adjustably driven by a prime mover, for instance by a diesel engine. Under the control of valves 61, 62 it supplies fluid (e.g. oil) to the entrance port (conduit 55 in the valve position shown) of the distributor 10 which feeds them alternately to the two sets of chambers 14, 15, here the chambers 14 which momentarily act as high-pressure chambers. From them the fluid is transmitted via the corresponding conduits 11 to their respective cylinders to actuate the associated plungers 3. These plungers are forced inwardly against the camming surface 5 and impart to the driven member 6 a torque equal to the sum of the individual products of the normal components of the forces of each plunger and its arm in relation to the central axis of the member 6. As shown in FIG. 1, the interconnection between member 6 and rotor 12 (via chain 60) and between cylinders 2 and housing 10 (via conduits 11) is so arranged that the normal components of the force of the fluid-urged plungers 3 are offset from the axis of rotation of the driven member 6 in such sense that this member is rotated counterclockwise. At the instant when the point of contact between a plunger 3 and the triangular surface 5 passes the center line C of one of its sides, the distributor 10 reverses the connection of the corresponding conduit 11 so that the latter now communicates with a low-pressure chamber 15 whereby the pressure inside cylinder 2 is relieved; as the member 6 by its continuing rotation forces the plunger 3 back into the cylinder 2, the fluid is pumped back via conduit 11 to the low-pressure chamber 15 and from there via conduit 59 and valve 62 to the reservoir 20. Pipe 21 feeds the fluid back to pump 19 and thus closes the circuit.

In the embodiment of the invention illustrated in FIGS. 1 and 2 the torque transmitted by the hydraulic drive is determined solely by the hydraulic pressure supplied by pump 19. In case the resistance to rotation of the driven member 6 increases, the rotative speed of the driven member is reduced (possibly to zero) but the torque remains undiminished. When the torque transmitted by the hydraulic drive overcomes the load resistance, the speed of rotation of the driven member increases until equilibrium is attained.

Figure 3:
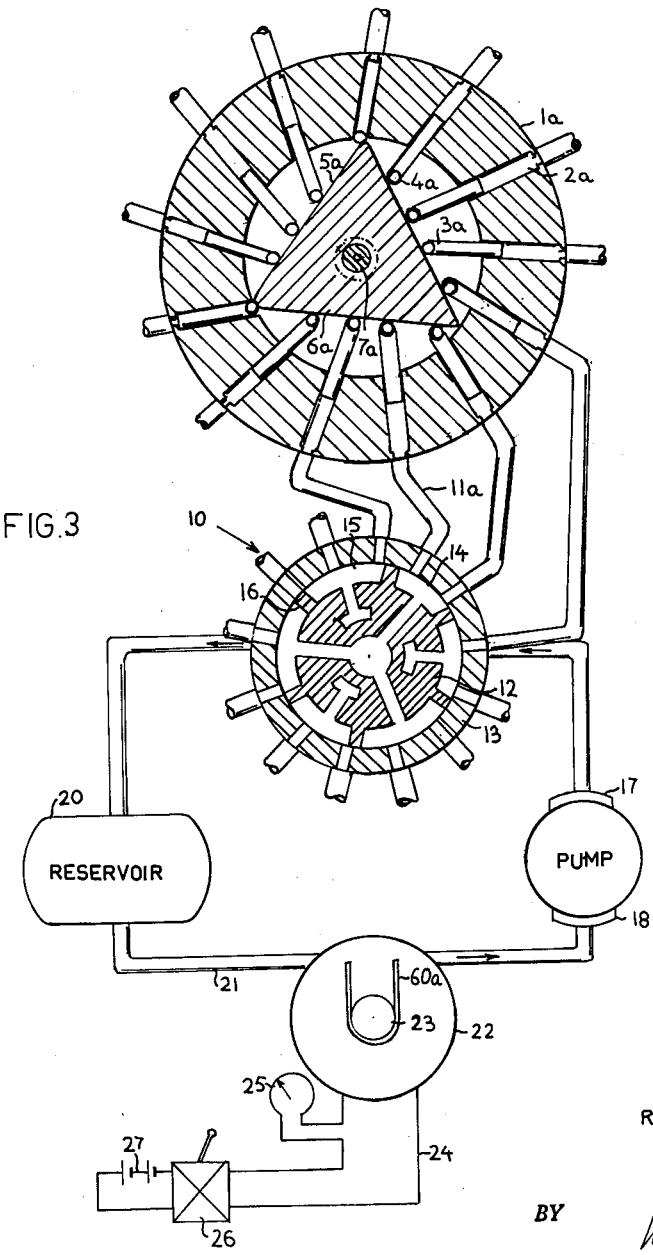
FIG. 3 is a view similar to FIG. 1 of another transmission system embodying the invention.

In FIG. 3 a modified embodiment of the present invention is shown. It is basically similar to the one illustrated in FIG. 1, the only differences being the off-radial positioning of the piston cylinders 2a and the use of independent drive means for rotating the distributor. The cylinders 2a are equally spaced around the periphery of a cylinder housing 1a, all cylinders being inclined in the same sense and at the same angle with respect to the radial direction so that their longitudinal axes do not meet in a common center but are instead tangent to a common circle around the axis of rotation of the driven member 6a, which is mounted on shaft 7a. The effect of this inclination of cylinders 2a is that the force exerted by the plungers 3a upon the drive member 6a is shifted towards one side to an extent favoring rotation in a particular sense (here counterclockwise). It should be noted, however, that this inclination of the plungers is limited enough to enable each plunger to be cammed back by its roller 4a during such rotation and that, furthermore, each side of camming surface 5a is at all times engaged by at least one plunger capable of exerting thereon a force tending to rotate the member 6a in the opposite (i.e. clockwise) direction, albeit with a lesser torque.

The distributor 10 is driven by pulley 23 of an electric motor 22 via a belt 60a. The motor 22 is powered from a source 27 through circuit 24 including a reversing switch 26 and a speed-controlling rheostat 25. The other parts of the hydraulic transmission system shown in FIG. 3 are basically similar to the one illustrated in FIGS. 1 and 2, except for a modification in the connections of conduits 11a with consequent inversion in the relative rotation of rotor 12 and driven member 6a.

Owing to the provision of separate drive means for distributor 10 it is possible to control the pressure alternations in conduits 11a and cylinders 2a independently of the speed of rotation of the driven member 6a. As long as sufficient torque is provided by the plungers 3a to overcome the resistance of the load, the member 6a follows the pressure variations and rotates at the same speed as the rotor 12 of distributor 10. In case the provided torque is not sufficient, the driven member 6a may lag behind but will always tend to fall into step with the hydraulic controller whenever the driving torque balances the load resistance. The independently driven distributor thus acts as a maximum-speed regulator; the driven member does not surpass the speed of rotation determined by the distributor 10 even when the applied torque is much greater than the load resistance to rotation since any such acceleration would give rise to a counteracting torque.

Figures 4, 5:
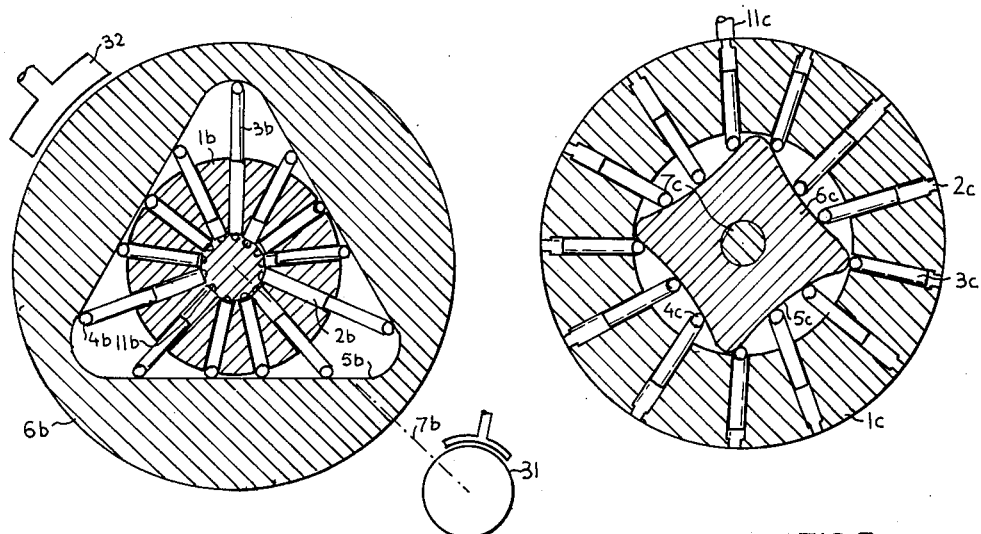
FIGS. 4 and 5 are cross-sectional views of modifications of the hydraulic drive according to my invention.

In the embodiment shown in FIG. 4 a cylindrical driven member 1b is rotatively journaled, in bearings not shown, inside a prismatic cavity of triangular cross-section formed in a drive member 6b. Driven member 1b is mounted on a shaft 7b and can be checked by a brake 31, whereas the rotation of drive member 6b can be stopped by a brake 32. The member 1b comprises a plurality of borings 2b equispaced along its circumference and radially directed towards its center. Plungers 3b are slidable within the borings 2b and, by means of rollers 4b mounted on their outer extremities, bear upon the internal camming surface 5b of member 6b. The plungers 3b are actuated by pressure from fluid delivered to them via conduits 11b.

By suitably varying the pressures inside the individual borings 2b it is again possible to obtain a force capable of rotating the primary drive member 1b in relation to the secondary drive member 6b. The conduits 11b can be supplied by fluid from hydraulic systems similar to those already described. Either the member 1b or the member 6b may be checked by the appropriate brake, so that the other is free to rotate; it is also possible to have both free to rotate and to transmit motion to the respective loads.

In the embodiment shown in FIG. 5 a primary member 1c provided with a plurality of radially spaced cylinders 2c for plungers 3c surrounds a driven secondary member 6c of quadrilateral cross-section with concave sides. Each plunger 3c is provided with a ball 4c which is in contact with the camming surface 5c of the driven member 6c. Conduits 11c provide the individual cylinders 2c with fluid under pressure from a hydraulic system not shown in this figure but similar to those already described. Also in this embodiment it is possible, by suitably varying the pressure inside each cylinder 2c, to impart to the driven member 6c a torque which can then be further transmitted via shaft 7c.

Figure 6:
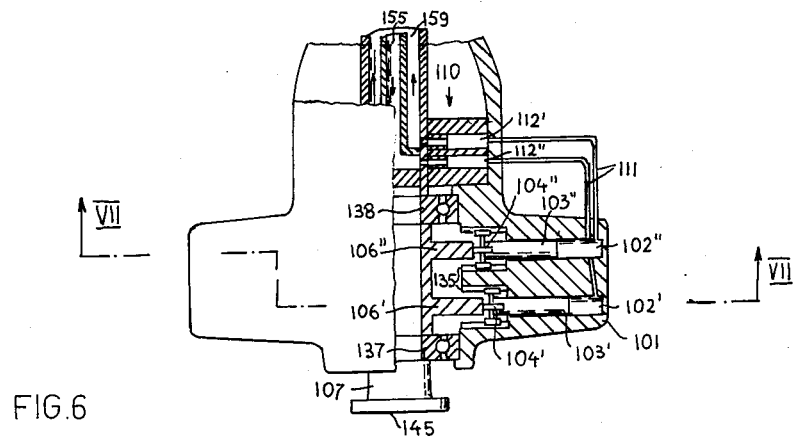
FIG. 6 is a partly cut-away elevational view of a further embodiment.
Figure 7:
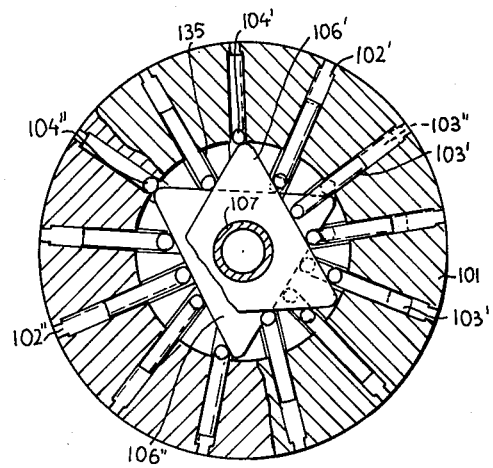
FIG. 7 is a cross-sectional view taken along line VII—VII of FIG. 6.

In the embodiment shown in FIGS. 6 and 7 an outer periphery member 101 comprises two rows of radial borings 102', 102" uniformly spaced along the circumference of its body. Plungers 103', 103" are slidable within the borings and are further supported in guides 135. Each plunger is provided at its projecting end with a respective roller 104', 104" slidable within the guides 135 and bearing upon secondary drive members 106', 106", of triangular shape, which are mounted on a common shaft 107 and are offset from each other by an angle of 60°, as shown in FIG. 7. The rotor of distributor 110 which comprises two sections 112', 112", each forming a set of alternate high-pressure and low-pressure chambers, is also mounted on shaft 107. The housing of the distributor 110 is rigidly connected with the member 101. A pump (not shown) supplies fluid under pressure to the high-pressure chambers via a pipe 155, low-pressure chambers being connected to a pipe 159 which surrounds pipe 155 and feeds the fluid back to the input of the pump, thus completing the hydraulic circuit. Pipes 111 connect the distributor 110 with the borings 102', 102". Shaft 107 is mounted in bearings 137, 138 and transmits the imparted torque to a load (not shown) via a coupling flange 145. As the triangular drive members 106', 106" are mutually offset, the sets of high-pressure and low-chambers of the two rotor sections 112', 112" have to be similarly offset by an angle of 60°. This arrangement of two mutually offset parallel drive systems, one comprising the triangular member 106' co-operating with plungers 103' and rotor section 112', the other comprising the triangular member 106" co-operating with plungers 103" and the rotor section 112", improves the smoothness of operation. By changing the direction of flow in the pipes 155, 159 it is possible to reverse the sense of rotation of the shaft 107.

As will be apparent from the foregoing disclosure, a hydraulic transmission system according to my invention can be made relatively small, compact and of simple construction, and can easily be adapted for various transmission purposes, e.g. as independent drives for tractor wheels.

I claim:
1. A hydraulic motor comprising an outer drive member having a substantially cylindrical surface provided with a plurality of generally radial bores circumferentially spaced therearound and forming piston cylinders, an inner drive member of generally prismatic configuration in said outer drive member coaxially journaled therein for rotation relative thereto, and a plurality of plungers displaceably lodged in said cylinders and provided with extremities bearing upon said inner drive member whereby said members are rotated relatively upon admission of a hydraulic fluid to and its discharge from said cylinders in a predetermined order of succession, said outer member being provided with wall portions at each of said cylinders bracketing said inner drive member and forming tracks extending substantially radially inwardly from said surface, said plungers each being provided with guide means at a respective one of said extremities rollingly engaging a respective track for supporting the respective piston at its extremity.

2. A hydraulic motor comprising an outer drive member having a substantially cylindrical surface provided with a plurality of generally radial bores circumferentially spaced therearound and forming two axially spaced annular rows of piston cylinders, an inner drive member of generally prismatic configuration in said outer drive member coaxially journaled therein for rotation relative thereto, said inner member being divided into two axially spaced sections of identical but angularly offset configuration aligned with respective rows of said cylinders, and a plurality of plungers displaceably lodged in said cylinders and provided with extremities bearing upon said inner drive member whereby said members are rotated relatively upon admission of a hydraulic fluid to and its discharge from corresponding cylinders of said rows in a predetermined order of succession.

3. A hydraulic motor comprising an outer drive member having a substantially cylindrical surface provided with a plurality of generally radial bores circumferentially spaced therearound and forming two axially spaced annular rows of piston cylinders, an inner drive member of generally prismatic configuration in said other drive member coaxially journaled therein for rotation relative thereto, said inner member being divided into two axially spaced sections of identical but angularly offset configuration aligned with respective rows of said cylinders, and a plurality of plungers displaceably lodged in said cylinders and provided with extremities bearing upon said inner drive member whereby said members are rotated relatively upon admission of a hydraulic fluid to and its discharge from corresponding cylinders of said rows in a predetermined order of succession, said outer member being provided with wall portions at each of said cylinders bracketing said inner drive member and forming tracks extending substantially radially inwardly from said surface, said plungers each being provided with a guide means at a respective one of said extremities rollingly engaging a respective track for supporting the respective piston at its extremity.

References Cited in the file of this patent

UNITED STATES PATENTS

| | | |
|---|---|---|
| 717,445 | Nestius | Dec. 30, 1902 |
| 1,654,378 | Marchetti | Dec. 27, 1927 |
| 2,326,464 | Jones | Aug. 10, 1943 |
| 2,473,785 | Cate | June 21, 1949 |
| 2,642,748 | Widmer | June 23, 1953 |
| 2,674,853 | Born | Apr. 13, 1954 |
| 2,709,422 | Bray | May 31, 1955 |

FOREIGN PATENTS

| | | |
|---|---|---|
| 18,510 | Great Britain | Aug. 27, 1903 |
| 529,508 | Germany | July 21, 1931 |
| 915,329 | France | Nov. 4, 1946 |
| 533,617 | Canada | Nov. 27, 1956 |